US007661909B2

(12) United States Patent
Beaume

(10) Patent No.: US 7,661,909 B2
(45) Date of Patent: Feb. 16, 2010

(54) METHOD AND A DEVICE FOR POWDERING, AND A USE THEREOF IN A POWDERING SYSTEM, IN PARTICULAR IN AN INSTALLATION FOR DETECTING SURFACE DEFECTS BY SWEATING

(75) Inventor: Pascal Didier Beaume, Bayonne (FR)

(73) Assignee: Turbomeca, Bordes (FR)

( * ) Notice: Subject to any disclaimer, the term of this patent is extended or adjusted under 35 U.S.C. 154(b) by 502 days.

(21) Appl. No.: 11/553,237

(22) Filed: Oct. 26, 2006

(65) Prior Publication Data

US 2007/0098885 A1 May 3, 2007

(30) Foreign Application Priority Data

Oct. 28, 2005 (FR) .................................. 05 11046

(51) Int. Cl.
*B65G 53/66* (2006.01)

(52) U.S. Cl. ........................................ 406/24; 406/142

(58) Field of Classification Search ................... 406/86, 406/89, 90, 91, 138, 141, 142, 143, 146, 406/163, 122, 145, 155, 191, 192, 193; 239/142, 239/143, 553.3
See application file for complete search history.

(56) References Cited

U.S. PATENT DOCUMENTS

| | | | | |
|---|---|---|---|---|
| 914,105 | A * | 3/1909 | Boland | 451/89 |
| 2,616,766 | A * | 11/1952 | Sanborn et al. | 406/143 |
| 2,687,331 | A * | 8/1954 | Eugene | 406/146 |
| 2,696,933 | A * | 12/1954 | Barclay et al. | 222/642 |
| 2,817,310 | A * | 12/1957 | Ponzini | 118/46 |
| 3,305,140 | A | 2/1967 | Johnson | |
| 3,933,394 | A * | 1/1976 | Klein et al. | 406/90 |
| 5,749,684 | A * | 5/1998 | Horn Feja | 406/141 |
| 6,598,803 | B1 | 7/2003 | Haas et al. | |

FOREIGN PATENT DOCUMENTS

| | | |
|---|---|---|
| DE | 1 005 413 | 3/1957 |
| FR | 2 163 182 | 7/1973 |

* cited by examiner

*Primary Examiner*—Gene Crawford
*Assistant Examiner*—William R Harp
(74) *Attorney, Agent, or Firm*—Oblon, Spivak, McClelland, Maier & Neustadt, L.L.P.

(57) ABSTRACT

Gas under pressure is admitted through an orifice formed in the bottom portion of a tank of substance in powder form, and is guided along an internal tube connected to the admission orifice, the tube passes through the powder stored in the tank and entrains powder through openings formed in the wall of the tube, the powder being extracted in the form of a gas-and-powder flow through an outlet at the top portion of the tank. The gas-and-powder mixture traveling along the internal tube is guided to the top portion of the tank where it is directed substantially towards a side wall of the tank so as to set up a gas-and-powder flow traveling through the volume situated in the tank above the powder stored in the tank, prior to the gas-and-powder flow being extracted through the outlet. The gas-and-powder flow can be taken to one or more powdering nozzles, e.g. in a system for powdering a developer in an installation for detecting surface defects by sweating.

9 Claims, 2 Drawing Sheets

METHOD AND A DEVICE FOR POWDERING, AND A USE THEREOF IN A POWDERING SYSTEM, IN PARTICULAR IN AN INSTALLATION FOR DETECTING SURFACE DEFECTS BY SWEATING

BACKGROUND OF THE INVENTION

The invention relates to powdering, and in particular to a powdering system, and more particularly it relates to a method and to a device enabling a film of powder to be formed on the surface of a part, the film being continuous and substantially uniform.

An example of a use for the invention lies in forming a deposit of a developer in powder form on the surfaces of parts in an installation for detecting any open defects that might be present in the surfaces of parts under inspection, in particular metal parts that might present surface defects in the form of fissures or cracks. In certain installations, a penetrating composition including an indicator substance is applied to the surfaces of the parts for inspection. After the surfaces have been washed and dried, a developer in powder form, such as talc, is deposited on the surfaces of the part in order to cause the indictor substance that has penetrated into any defects and that has therefore not been eliminated by washing, to be extracted from those defects by capillarity. The indicator substance is typically a colored or fluorescent compound that shines under ultraviolet (UV) illumination, thereby providing an easily-visible indication that a defect is present.

The continuity, the regularity, and the uniformity of the deposit of the developer are parameters that have an influence on the quality of detection.

Patent document FR 2 163 182 describes a dispenser for measuring out a powder, the dispenser having a pierced tube that is fed with air under pressure and that passes through a fluidized bed of powder contained in a tank. The tube opens out into the top portion of the tank above the bed of powder, and a mixture of air and powder as ejected by the tube is taken up immediately on leaving the tube by an outlet pipe. Any clumps of powder grains entrained with the air traveling along the tube will therefore also be taken out.

OBJECT AND SUMMARY OF THE INVENTION

In a first aspect of the invention, an object of the invention is to provide a method of powdering a substance in powder form that enables a continuous and substantially uniform deposit to be formed on the surfaces of parts, in particular a deposit that is of regular thickness without any clumps.

This object is achieved by a method of the type comprising: admitting gas under pressure through an orifice formed in the bottom portion of a tank of substance in powder form; guiding the admitted gas into an internal tube connected to the gas admission orifice and passing through the powder stored in the tank; causing the gas traveling along the internal tube to entrain powder through openings formed in the wall thereof; and extracting from the tank a gas-and-powder flow through an outlet in the top portion of the tank;

in which method, in accordance with the invention, the mixture of gas and powder traveling along the internal tube is guided by the tube to the top portion of the tank and is directed on leaving the internal tube substantially towards a side wall of the tank in such a manner as to set up a gas-and-powder stream traveling through the volume situated inside the tank above the powder stored in the tank, prior to extracting the gas-and-powder flow through the outlet.

Directing the gas-and-powder mixture towards a wall of the tank serves to break up at least in part any clumps of powder grains picked up by the gas flowing along the internal duct, and serves to establish a flow in the top volume of the tank that encourages heavier grains or clusters of grains to be redeposited on the surface of the stored powder, while also making the flow more uniform prior to being extracted. It is thus possible to extract a flow of powder from the tank that is substantially uniform.

According to a feature of the method, the stream of the gas-and-powder flow travels through the volume situated inside the tank above the stored powder by traveling along a path going from the top portion of said volume at the outlet from the internal tube towards the bottom portion of said volume, and then towards the top portion of said volume going towards the outlet.

According to another feature of the method, the gas-and-powder mixture traveling along the internal tube is directed towards a side wall of the tank in a direction that is substantially opposite from the direction in which the outlet from the tank opens out into the inside of the tank.

In a second aspect of the invention, the invention seeks to provide a device for powdering a substance in powder form, the device being of the type comprising a tank of substance in powder form, a gas admission orifice for admitting gas under pressure that is formed in the bottom portion of the tank, an internal tube connected to the gas admission orifice and provided with perforations over at least a fraction of its length passing through the powder stored in the tank, and an outlet for a gas-and-powder flow situated in the top portion of the tank, in which device, in accordance with the invention, the internal tube extends into the top volume of the tank above the powder stored in the tank and opens out at its end in the top portion of the tank towards a side wall thereof so as to enable a gas-and-powder flow stream from the internal tube to be set up that travels through said top volume of the tank prior to being extracted through the outlet.

Preferably, the end of the internal tube opens out in a direction that is substantially opposite to the direction in which the gas-and-powder flow outlet opens out into the tank.

In a third aspect of the invention, the invention seeks to provide a system for powdering a substance in powder form and including a powdering device as defined above together with at least one powdering nozzle having a first inlet for the gas-and-powder flow connected to the outlet of the powdering device by a first pipe, and a second inlet for gas under pressure for connection to a source of gas under pressure by a second pipe.

Advantageously, a plurality of powdering nozzles can be provided with first and second inlets connected in parallel to the first and second pipes, respectively.

In a fourth aspect, the invention seeks to provide an installation for detecting open defects in the surfaces of parts by sweating, the installation including a powdering system as defined above for powdering on the developer in powder form.

Advantageously, the first and second pipes of the powdering system are fitted with respective pressure-measuring sensors for providing information representative of the pressures of the gas-and-powder flow and of the gas admitted into the tank, and the installation includes a control unit receiving the signals produced by the pressure sensors and issuing an alarm in the event of the measured pressure values lying outside respective predetermined ranges.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS OF THE INVENTION

Figure 1:
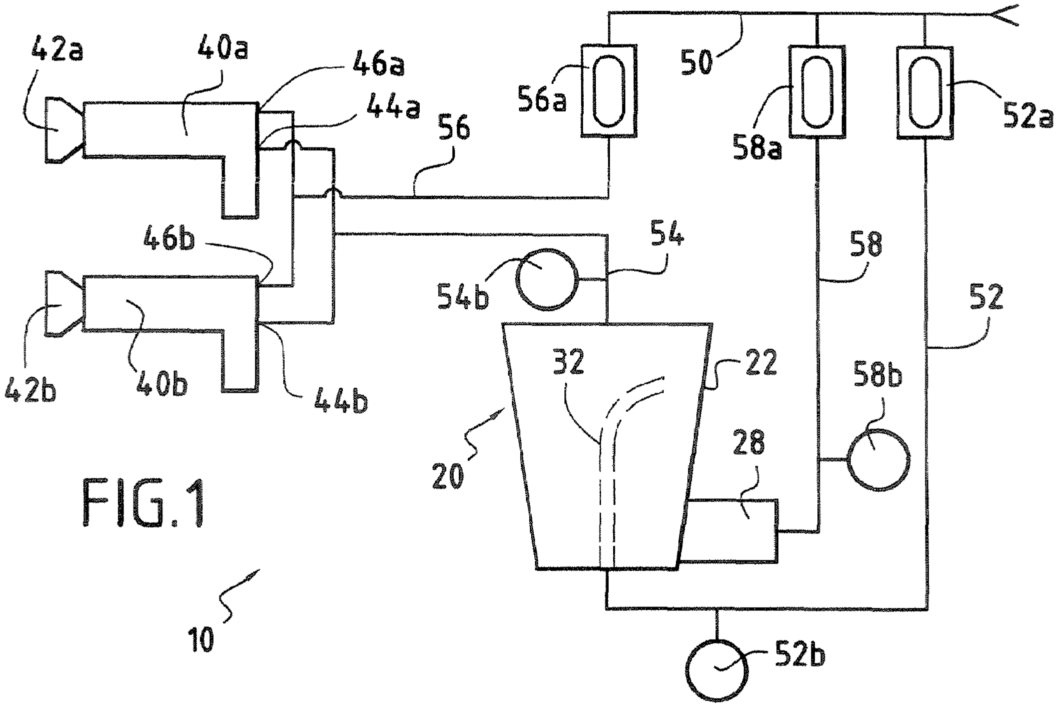
FIG. 1 is a very diagrammatic view of a powdering system in an embodiment of the invention.

FIG. 1 shows a system 10 for powdering a substance in powder form, the system comprising a powdering device 20 that produces a gas-and-powder flow, two guns 40*a*, 40*b* fitted with respective powdering nozzles 42*a*, 42*b*, a line 50 for feeding gas under pressure, a pipe 52 provided with an expander 52*a* and connecting the line 50 to an inlet of the powdering device 20, a pipe 54 connecting an outlet from the device 20 in parallel to two first inlets 44*a*, 44*b* of the guns 40*a*, 40*b*, and a pipe 56 provided with an expander 56*a* and connecting the line 50 in parallel to two second inlets 46*a*, 46*b* of the guns 40*a*, 40*b*. The powdering system 10 may be of the electrostatic type using means (not shown) for charging the powder electrostatically.

Figure 2:
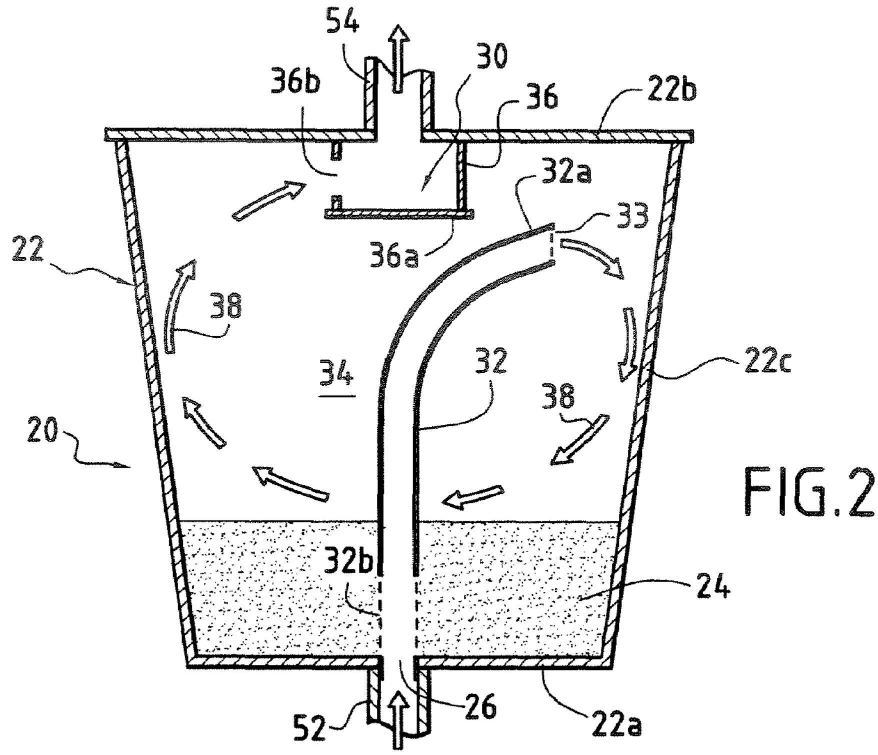
FIG. 2 is a diagrammatic detailed section view of a powdering device forming part of the FIG. 1 system.

As shown in FIG. 2, the powdering device 20 comprises a tank 22 with a substance in powder form 24 stored in the bottom thereof. The pipe 52 is connected to an admission orifice 26 formed in the bottom portion of the tank 22, e.g. via the central portion of the bottom 22*a* of the tank. A vibrator 28 (FIG. 1) is associated with the tank 22 and is actuated by gas under pressure coming from the line 50 via a pipe 58 provided with an expander 58*a*.

The gas under pressure admitted by the orifice 26, typically compressed air, entrains the powder contained in the tank so as to form a gas-and-powder flow that is taken up by the pipe 54 connected to an outlet 30 formed in the top portion of the tank, e.g. through its cover 22*b*.

A tubular duct or tube 32 inside the tank is connected to the admission orifice 26 and extends inside the tank towards the top portion thereof. Over a fraction of its length starting from the orifice 26, the tube 32 has its wall perforated so that air penetrating into the tube 32 takes in powder from the powder stored in the tank through the perforations 32*b* in the wall of the tube. Arrangements may be made for powder to be taken in only in the vicinity of the bottom of the tank, with the tube 32 then being non-perforated all the way to its end 32*a* opening out into the top portion of the volume 34 of the tank situated above the stored powder. At its end 32*a*, the tube 32 is provided with a grid 33 through which the air-and-powder mixture penetrates into the volume 34, the tube 32 opening out substantially towards a side wall 22*c* of the tank, preferably in the vicinity of the wall and of the cover 22*b*.

The outlet 30 is fitted with a tubular element 36 that penetrates a little into the tank 22 and that is provided at its end or bottom with a shutter 36*a*. The tubular element 36 presents in its side wall one or more openings 36*b* through which the air-and-powder flow can be extracted from the tank.

The opening(s) 36*b* open(s) out into the tank 22 in a direction substantially opposite to the direction in which the tube 32 opens out into the tank at its end 32*a*. This establishes a stream 38 of the air-and-powder mixture coming from the tube 32 within the volume 34. This stream travels through the volume 34 from its top portion near the opening 32*a* down towards the bottom portion of the volume 34 in the vicinity of the top surface of the powder stored in the tank, and then up to the top portion of the volume 34 towards the opening(s) 36*b*. The presence of the grid 33, the ejection of the air-and-powder mixture from the tube 32 towards the side wall 22*b* of the tank, and the substantially turbulent stream 38 that is set up all contribute to breaking up any clumps of powder that might have been picked up by the air entering the duct 32, with the heaviest clumps of powder particles being redeposited on the surface of the stored powder and with the air-and-powder flow that is admitted into the pipe 54 being made uniform. Thus, an air-and-powder flow is made available that is suitable for depositing films of powder that are regular and uniform in terms of grain size and thickness. In addition, having the guns 40*a*, 40*b* connected in parallel to the pipe 54 enables them to receive the same air-and-powder flow at the same pressure and enables them to present the same effectiveness.

In the example shown, the outlet 30 is situated in the central portion of the cover 22*b*. It could be off-center, being closer to the side wall of the tank that is remote from the portion of said wall near the outlet from the tube 32.

Figure 3:
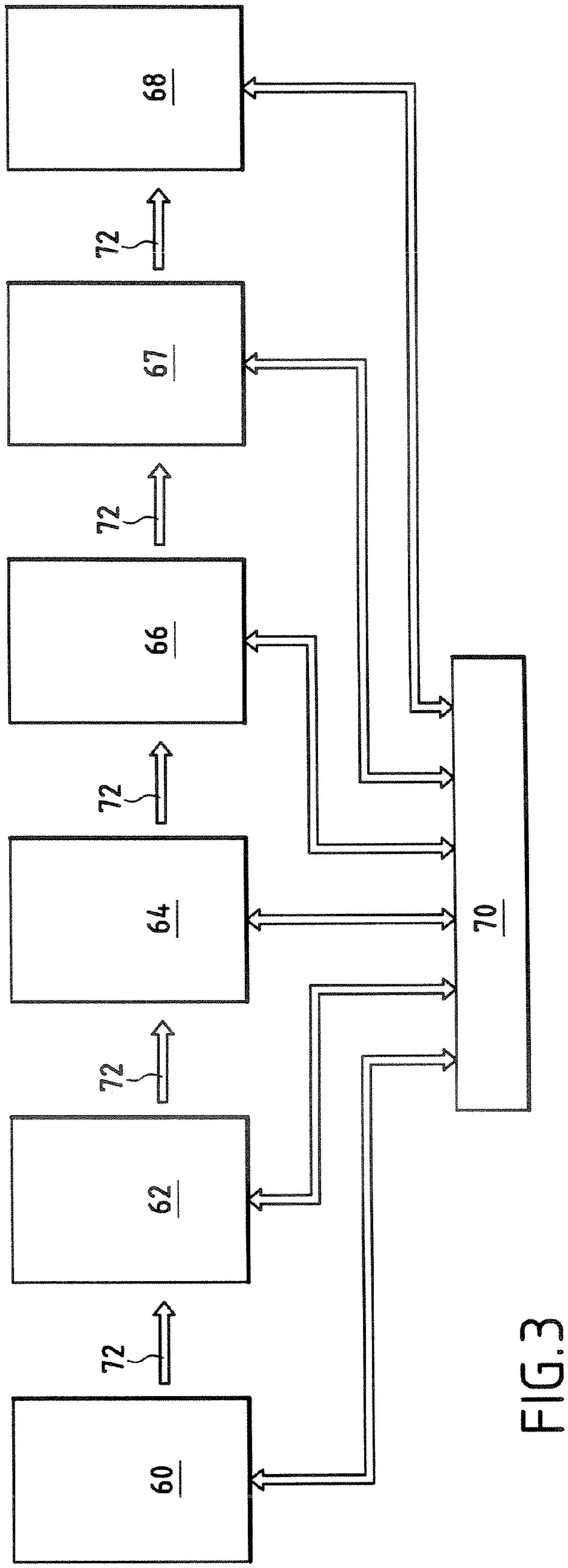
FIG. 3 is a very diagrammatic view of an installation for detecting open defects in the surface of parts by sweating and making use of a system of the kind shown in FIG. 1 for powdering on a developer.

FIG. 3 is a highly diagrammatic representation of an installation for detecting any open defects that might be present in the surfaces of parts by using a sweating technique. In conventional manner, such an installation comprises a station 60 for applying a penetrating composition containing an indicator substance onto the surfaces of the parts for inspection, a station 62 for pre-rinsing the surfaces of the parts, a station 64 for applying an emulsifier to the surfaces of the parts, a station 66 for rinsing the surfaces of the parts, a dryer station 67, and a station 68 for applying a developer to the surfaces of the parts.

The operation of the installation is controlled by a control unit 70 which controls the stations 60, 62, 64, 66, 67, and 68, and which transfers the parts between them (arrows 72), the parts being supported by a loader device that is transferred automatically from one station to another by a loading frame (not shown).

The indicator substance is a colored or fluorescent compound that shines when appropriately illuminated and thus serves to reveal the existence and the nature of any open defects by visual examination or by image analysis. The indicator substance is applied by spraying in a vessel in the station 60, with a load of parts being driven in rotation inside the vessel.

The surfaces of the parts are cleaned so as to leave penetrating composition only within any cracks or fissures that might be present in the surfaces of the parts. In the example shown, cleaning comprises in succession pre-rinsing, applying an emulsifier, rinsing, and drying.

The pre-rinsing is performed in the station 62 which comprises a vessel fitted with nozzles for spraying water under pressure, the nozzles being steerable so as to match the spraying to the particular load of parts for inspection.

The station 64 comprises a vessel containing a bath of emulsifier for encouraging washing and provided with a device for stirring the bath.

Rinsing is performed in the station 66 which, in the same manner as the pre-rinsing station 62, comprises a vessel fitted with steerable nozzles for spraying water under pressure. After rinsing, drying is performed under hot air in the station 67.

The developer is a powder which, by capillarity, causes the penetrating composition that has penetrated into the defects (cracks or fissures) that might be present in the surfaces of the parts to be extracted therefrom. The developer is applied in the station 68 in a vessel fitted with powdering guns fed by an air-and-powder flow, with the load of parts being caused to rotate within the vessel. Advantageously, a powdering system is used of the kind shown in FIG. 1 that is fitted with a powdering device of the kind shown in FIG. 2 so as to form a film of developer powder that is regular and uniform, thereby guaranteeing high quality detection of defects.

In addition to the indicator and developer substances used, various parameters influence the quality or the reliability of the inspection process. These parameters include in particular the duration and the pressure of the spraying of the indicator substance, the water pressure and the duration used for pre-rinsing and for rinsing, the duration of immersion in the emulsifier, the duration and the temperature of drying, the duration of powdering the developer, and the pressure of the air-and-powder flow fed to the nozzles for powdering the mixture, the air pressures feeding the tank and the vibrator of the device for powdering the developer, and the speeds of rotation of the loads within the vessels of the stations 60 and 68.

Optimum values can be predetermined for at least some of these parameters serving to obtain the best possible playback of images of surface defects. One process for optimizing an installation for inspecting parts by sweating is described in patent document EP 0 650 045. That process makes use of standard testpieces, i.e. sample parts that present characteristic surface defects that are known.

The real values of several parameters are advantageously measured during the process of inspecting a load of parts by using sensors or measurement equipment. Thus, for the powdering installation of FIG. 1, respective pressure-measuring sensors 54*b*, 52*b*, and 58*b* are mounted on the pipes 54, 52, and 58 respectively in order to provide information representative of the pressure of the air-and-powder flows feeding the guns 40*a*, 40*b* and the nozzles 42*a*, 42*b*, representative of the air pressure in the pipe 52 feeding the tank 22, and representative of the air pressure in the pipe 58 feeding the vibrator 28. The information from the measurement equipment or sensors is transmitted to the control unit 70 so as to be recorded and possibly produce an alarm in the event of the value of a measured parameter lying outside a respective predetermined range of good values. A list of values for the measured parameters and of any alarm generated can be archived in association with the identities of the loads of parts being inspected, so as to achieve statistical control over the inspection process.

What is claimed is:

1. A method of powdering a substance in powder form, the method comprising:

admitting gas under pressure through an orifice formed in the bottom portion of a tank of substance in powder form;

guiding the admitted gas into an internal tube connected to the gas admission orifice and passing through the powder stored in the tank;

causing the gas traveling along the internal tube to entrain powder through openings formed in the wall thereof; and extracting from the tank a gas-and-powder flow through a tank outlet in the top portion of the tank, wherein the mixture of gas and powder traveling along the internal tube is guided to the top portion of the tank and is directed substantially towards a side wall of the tank in such a manner as to set up a gas-and-powder stream traveling through a volume situated inside the tank above the powder stored in the tank, prior to extracting the gas-and-powder flow through the tank outlet, and wherein the gas-and-powder mixture traveling along the internal tube is directed towards the side wall of the tank in a direction that is substantially opposite from the direction in which the tank outlet opens out into the inside of the tank.

2. A method according to claim 1, wherein the stream of the gas-and-powder flow travels through the volume situated inside the tank above the stored powder by traveling along a path going from the top portion of said volume from the internal tube towards the bottom portion of said volume, and then towards the top portion of said volume going towards the tank outlet.

3. A device for powdering a substance in powder form, the device comprising:

a tank of substance in powder form, a gas admission orifice for admitting gas under pressure, said gas admission orifice being formed in the bottom portion of the tank, an internal tube connected to the gas admission orifice and provided with perforations over at least a fraction of its length passing through the powder stored in the tank, and a gas-and-powder flow outlet for a gas-and-powder flow situated in the top portion of the tank, wherein the internal tube extends into a top volume of the tank above the powder stored in the tank and opens out at its end in the top portion of the tank towards a side wall thereof, and wherein the end of the internal tube opens out in a direction that is substantially opposite to the direction in which the gas-and-powder flow outlet opens out into the tank.

4. A device according to claim 3, wherein the end of the internal tube is provided with a grid.

5. A system for powdering a substance in powder form, the system comprising:

a powdering device comprising a tank of substance in powder form, a gas admission orifice for admitting gas under pressure, said gas admission orifice being formed in the bottom portion of the tank, an internal tube connected to the gas admission orifice and provided with perforations over at least a fraction of its length passing through the powder stored in the tank, and a gas-and-powder flow outlet for a gas-and-powder flow situated in the top portion of the tank, wherein the internal tube extends into a top volume of the tank above the powder stored in the tank and opens out at its end in the top portion of the tank towards a side wall thereof, wherein the end of the internal tube opens out in a direction that is substantially opposite to the direction in which the gas-and-powder flow outlet opens out into the tank, and at least one powdering nozzle having a first inlet for the gas-and-powder flow connected to the gas-and-powder flow outlet of the powdering device by a first pipe, and a second inlet for gas under pressure for connection to a source of gas under pressure by a second pipe.

6. A powdering system according to claim 5, further comprising a plurality of powdering nozzles having first and second inlets connected in parallel to the first pipe and to the second pipe, respectively.

7. A powdering system according to claim 5, further comprising a pressure sensor mounted on the first pipe to deliver information representative of the pressure of the gas-and-powder flow, and a second pressure sensor mounted on a pipe for feeding the gas admission orifice of the tank of substance in powder form to provide information representative of the pressure of the gas admitted into the tank.

8. An installation for detecting open defects in the surfaces of parts by sweating, the installation including a system for powdering a developer in powder form, said system comprising a powdering device comprising a tank of substance in powder form, a gas admission orifice for admitting gas under pressure, said gas admission orifice being formed in the bottom portion of the tank, an internal tube connected to the gas admission orifice and provided with perforations over at least a fraction of its length passing through the powder stored in the tank, and a gas-and-powder flow outlet for a gas-and-powder flow situated in the top portion of the tank, wherein the internal tube extends into a top volume of the tank above the powder stored in the tank and opens out at its end in the top portion of the tank towards a side wall thereof, wherein the end of the internal tube opens out in a direction that is substantially opposite to the direction in which the gas-and-powder flow outlet opens out into the tank, and said system further comprising at least one powdering nozzle having a first inlet for the gas-and-powder flow connected to the gas-and-powder flow outlet of the powdering device by a first pipe, and a second inlet for gas under pressure for connection to a source of gas under pressure by a second pipe.

9. An installation according to claim 8, said system further comprising a pressure sensor mounted on the first pipe to deliver information representative of the pressure of the gas-and-powder flow, and a second pressure sensor mounted on a pipe for feeding the gas admission orifice of the tank of substance in powder form to provide information representative of the pressure of the gas admitted into the tank, said installation further comprising a control unit for receiving signals produced by pressure sensors and issuing an alarm in the event of the measured pressure values lying outside respective predetermined ranges.

* * * * *